Figure 2:
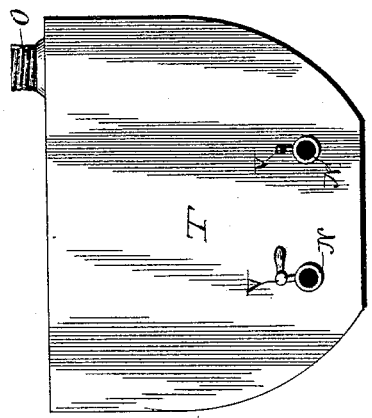

(No Model.)

H. MYERS.
INSECTICIDE DISTRIBUTER.

No. 454,117. Patented June 16, 1891.

Witnesses
Inventor
Hiram Myers,
By his Attorneys,
C. A. Snow & Co.

United States Patent Office.

HIRAM MYERS, OF CRANSTON, MICHIGAN.

INSECTICIDE-DISTRIBUTER.

SPECIFICATION forming part of Letters Patent No. 454,117, dated June 16, 1891.

Application filed December 5, 1890. Serial No. 373,704. (No model.)

*To all whom it may concern:*

Be it known that I, HIRAM MYERS, a citizen of the United States, residing at Cranston, in the county of Oceana and State of Michigan, have invented a new and useful Insecticide-Distributer, of which the following is a specification.

This invention relates to irrigation and sprinkling, and more especially to devices under this head by means of which liquid poison is distributed upon plants—such, for instance, as potatoes.

The object of the invention is to provide devices for delivering a liquid from a knapsack-tank to a sprayer, which will hold the same until it is shaken, in order that the operator can pass from one plant to another without sprinkling the intervening space, and in order also that he can cause the device to feed whenever desired. This object I accomplish by the devices hereinafter more fully described and claimed, and as illustrated in the drawings, in which—

Figure 4:
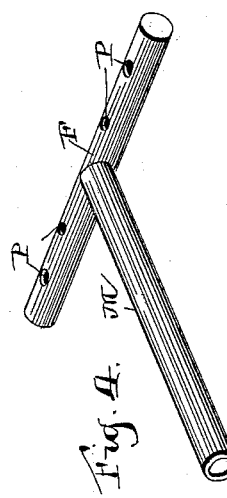
Figure 3:
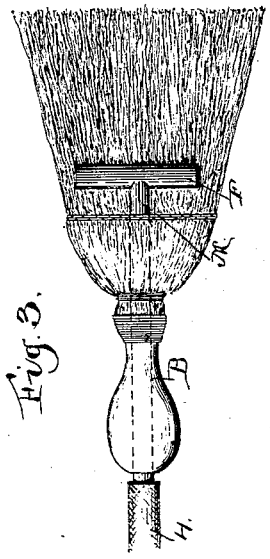
Figure 1:
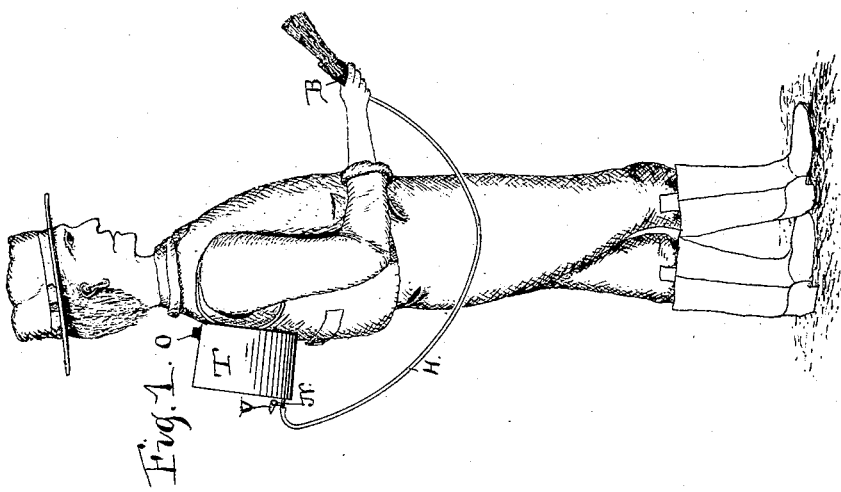

Figure 1 is a general view in outline of my invention, shown as arranged upon the back of an operator and ready for use. Fig. 2 is a rear elevation of the same. Fig. 3 is a plan of the sprayer. Fig. 4 is an enlarged detail view of the feeder device for supplying liquid to the sprayer.

Referring to the said drawings, the letter T designates a tank, which is preferably made in the form of a knapsack carried upon the back of the operator, as shown in Fig. 1, although it will be understood that this tank might be mounted upon a wheeled base and pushed before or dragged behind the operator, or, in fact, might be carried by another person, without departing from the spirit of my invention. I prefer, however, to form it in the shape of a knapsack, as above stated and as shown in the drawings. This tank may have a filling-opening O, through which air will be admitted to replace the liquid drawn out, and it also has one or more discharge-nozzles N, each having a valve V, as shown. From both or one of these nozzles leads a rubber hose H, which is of sufficient length to extend to a point as far in any direction as the operator can reach.

The sprayer which I preferably use in connection with the above-described tank is constructed as follows: B is an ordinary brush or broom of the kind known as "whisk-brushes" and of a size proportionate to the tank and to the rubber hose. The body of this brush is bent downwardly slightly at a point below the fastening-cords, and through the handle is passed a T-shaped metal tube M, whose upper end projects beyond the end of the handle and communicates with the rubber hose, and whose lower end passes under said fastening-cords and emerges from among the broom-corn at the point seen. The head or cross-piece of this metal tube constitutes the feeder device F for supplying liquid to the brush, and the latter constitutes the sprayer proper. This head is closed at its ends, but has a number of openings or perforations P through its side which is next the brush, as best seen in Fig. 4.

The tank being filled or partially filled with a liquid insecticide, (such as paris-green or London purple, and water,) one of the valves V is opened and the insecticide flows through the hose H, through the metallic tube M, into the feeder F, out of the perforations P thereof, and onto the brush B. The valve V is so adjusted that the liquid will flow in a steady stream, which is only of sufficient size to permit a limited discharge through the feeder to the brush, and the liquid runs thence down the broom-corn to the tips thereof. The operator holds the brush by its handle with the feeder uppermost, and when it is desired to sprinkle a plant the brush is given a flirt in the proper direction to throw the accumulated insecticide where needed, the downward bend of the brush preventing a spattering of the operator's person. A little experience will give the operator great skill in thus throwing the liquid wherever he desires and between the plants the brush will be filling, but not dripping. Moreover, if there is any particular part of a plant that is in especial need of attention it may be daubed or painted with the brush, as will be understood.

What is claimed as new is—

1. The combination, with a brush bent downwardly below its fastening-cords and having a longitudinal hole through its handle, of a feeder comprising a head resting on the brush below its bend, having perforations on its under side and a metallic tubular shank entering the brush at its bend and passing under its fastening-cords and removably through said hole in the handle, and a liquid-supply detachably connected with the protruding end of said shank, substantially as described.

2. The combination, with a brush having a longitudinal hole through its handle, of a feeder comprising a head resting on the brush and having perforations on its under side, and a metallic tubular shank entering the brush and passing under its fastening-cords and removably through said hole in the handle, and a liquid-supply detachably connected with the protruding end of said shank, substantially as described.

3. In an insecticide-distributer, the combination, with a supply-tank and a hose leading therefrom, of a sprayer comprising a brush bent downwardly at a point below its fastening-cords, and a T-shaped feeder, its cylindrical shank entering the brush at its bend, passing under said cords and through the brush-handle and being removably inserted in said hose, and its transverse head resting upon the brush below the bend thereof and having numerous perforations opening onto the broom-corn, substantially as described.

In testimony that I claim the foregoing as my own I have hereto affixed my signature in presence of two witnesses.

HIRAM MYERS.

Witnesses:
CHARLES H. ROSE,
A. E. SOUTER.